UNITED STATES PATENT OFFICE.

ARMAND JULIUS STIEGELMANN AND ERICH DEHNEL, OF LUDWIGSHAFEN-ON-THE-RHINE, GERMANY, ASSIGNORS TO BADISCHE-ANILIN & SODA FABRIK, OF LUDWIGSHAFEN-ON-THE-RHINE, GERMANY, A CORPORATION.

DECOLORIZATION OF EXTRACTS CONTAINING TANNIN.

No. 889,059.      Specification of Letters Patent.      Patented May 26, 1908.

Application filed July 12, 1906. Serial No. 325,939.

*To all whom it may concern:*

Be it known that we, ARMAND JULIUS STIEGELMANN and ERICH DEHNEL, doctors of philosophy and chemists, subjects of the German Emperor, residing at Ludwigshafen-on-the-Rhine, Germany, have invented new and useful Improvements in the Decolorization of Extracts Containing Tannin, of which the following is a specification.

The extracts obtained from barks which contain tannin are in many cases so strongly colored that they are unsuitable for use for tanning leather, because they discolor the leather. Attempts have been made to decolorize the said extracts by means of sulfurous acid, or of a hydrosulfite, but these either produce no decolorization, or any results obtained are not permanent because the coloring matter is merely reduced without being destroyed.

We have discovered that extracts containing tannin can be decolorized, and excellent and permanent results obtained, by treating such extracts with a formaldehyde sulfoxylate, or with a formaldehyde hydrosulfite compound (that is, formaldehyde sulfoxylate, and formaldehyde bisulfite, chemically, or otherwise united), which can be done for example by allowing the formaldehyde compound selected to react, while the extract is being evaporated by means of heat. Sodium formaldehyde sulfoxylate (rongalite C) and sodium formaldehyde hydrosulfite (hydrosulfite N. F., or hyraldite A) are, on account of their solubility in water, very suitable for use in carrying out our invention, but the corresponding salts of other metals such for instance as those of zinc, calcium, and barium, can also be used. These latter act more slowly, but possess the advantage that the metal either separates out, of its own accord, in the form of an insoluble compound, or can be subsequently precipitated and removed by filtration. As is well known, formaldehyde hydrosulfite behaves as if it were a combination of molecular proportions of formaldehyde sulfoxylate and formaldehyde bisulfite, consequently for the purposes of this invention formaldehyde sulfoxylate and formaldehyde hydrosulfite are equivalent.

The following are examples of how our invention can be carried into practical effect, but our invention is not confined to these examples.

Example 1: To one (1) liter of an aqueous extract of chestnut wood (of four (4) degrees Baumé) add five (5) grams of rongalite C (containing ninety (90) per cent. of sodium formaldehyde sulfoxylate) and evaporate the whole to dryness *in vacuo*.

Example 2: To one (1) kilogram of an aqueous extract of quebracho (of four (4) degrees Baumé) add twenty (20) grams of basic zinc formaldehyde sulfoxylate, heat for some time, filter off the solid residue, and evaporate the filtrate till the desired concentration has been attained.

Now what we claim is:

The process of decolorizing extracts containing tannin consisting in heating the said extracts in aqueous solution with a formaldehyde sulfoxylate.

In testimony whereof we have hereunto set our hands in the presence of two subscribing witnesses.

ARMAND JULIUS STIEGELMANN.
    ERICH DEHNEL.

Witnesses:
    ERNEST F. EHRHARDT,
    J. ALEC. LLOYD.